Dec. 7, 1937.   LA MAR S. COOPER   2,101,671

MAGNETIC CLUTCH

Filed May 5, 1936

Inventor:
La Mar S. Cooper,
by Harry E. Dunham
His Attorney.

Patented Dec. 7, 1937

2,101,671

UNITED STATES PATENT OFFICE 2,101,671

MAGNETIC CLUTCH

La Mar S. Cooper, Erie, Pa., assignor to General Electric Company, a corporation of New York Application May 5, 1936, Serial No. 78,006

10 Claims. (Cl. 192—84)

My invention relates to magnetic clutches.

An object of my invention is to provide an improved, compact, and totally enclosed electromagnetic clutch, requiring a small excitation power input.

Further objects and advantages of my invention will become apparent in the following description referring to the accompanying drawing, and the features of novelty, which characterize my invention, will be pointed out with particularity in the claims annexed to and forming a part of this specification.

Figure 1:
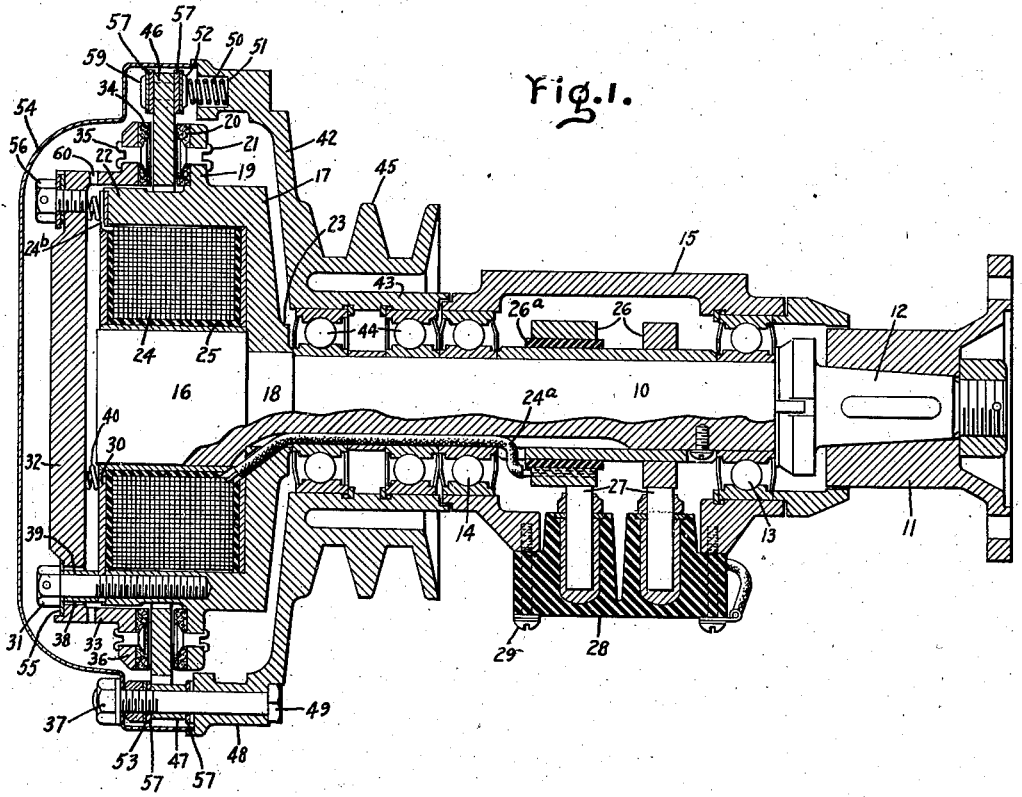
Figure 2:
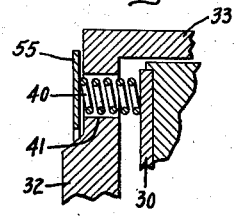

For a better understanding of my invention, reference is made to the accompanying drawing, wherein Fig. 1 is a sectional side elevation of my improved electromagnetic clutch, and Fig. 2 is a fragmentary sectional view through an edge of the clutch armature and yoke showing the arrangement for resiliently urging the armature away from the pole piece.

Referring to the drawing, I have shown a clutch embodying my invention having a rotatable shaft 10 provided with a coupling 11 secured on an end 12 of the shaft and adapted to be connected to any suitable source of power. The shaft 10 is rotatably supported by ball bearings 13 and 14 in a stationary housing 15. The shaft 10 is made of magnetic material and is constructed with an enlarged cylindrical head 16 which forms the central magnetic core for the electromagnetic clutch. A magnetic yoke 17 is secured on a shoulder 18 of the shaft 10 and is provided with a radially extending annular flange 19 to which a friction clutch facing 20 is secured by rivets 21. This magnetic yoke 17 includes a rim 22 and an integral hub 23 forming a housing about the central magnetic core 16.

The operation of the clutch is controlled by an exciting winding 24 arranged about the central magnetic core 16 within an annular recess formed by the housing 17 and is insulated from the magnetic members by insulating material 25. The energizing current for the winding 24 is supplied thereto through a set of slip rings 26 mounted on the shaft 10 and to which current is fed by brushes 27. One of the slip rings is mounted directly on the shaft 10 and the other is mounted on an insulating bushing 26a on the shaft. One end of the winding 24 is connected by a lead 24a to a slip ring 26 which is mounted upon the insulating bushing 26a and the other end 24b of the winding is electrically connected to another sl◯ ring 26 through the shaft 10, the yoke 17, and the retaining plate 30 to which it is soldered with a soft solder having a relatively low melting point. This soldered connection provides a protective arrangement in case the temperature of the clutch becomes excessive, as in the case of excessive slippage between the clutch facings 20 and 34 and the driving plate 46 the solder melts and opens the circuit to the coil 24, and thus prevents serious injury to the operating parts of the clutch. The brushes 27 are mounted on an insulating block 28 secured by screws 29 to the stationary housing 15. The exciting winding 24 is secured in position by a face plate 30 arranged over the outer surface thereof and bolted to the yoke 17 by a plurality of bolts 31 arranged about the periphery of the yoke 17. The clutch magnetic circuit including the central core 16 and the yoke 17 is completed through an armature disk 32 having an axially extending annular flange 33 extending about and surrounding the end of the rim 22 of the yoke. The air gap between the flange 33 and the rim 22 is made just sufficient to provide for mechanical clearance and, since the area between the surfaces is relatively large as compared to the area between the armature disk and the pole piece, the flux density is relatively low and, therefore, requires a relatively small magnetomotive force. This magnetically negligibly small air-gap between the armature and the yoke 22 remains substantially constant within the range of limited movement of the armature 32 with respect to the pole piece 16. Thus, this construction provides for the maximum usefulness of the magnetomotive force between the pole piece 16 and the armature disk 32, which is the variable air-gap producing magnetic pull. In order to facilitate determination of the air gap between the pole piece 16 and the armature disk 32, openings 60 are formed in the flange 33 to allow the insertion of a non-magnetic wire to measure the air gap between the pole piece and the armature. A friction clutch facing 34 is secured by a plurality of rivets 35 to a radially extending annular flange 36 formed on the end of the flange 33. This armature is mounted in an axially movable relation with respect to the yoke 17 on three bolts 31 through an annular flexible drive ring 55, which is secured on spacers 39 to the yoke 17 by the bolts 31, which are equally spaced about the circumference of the yoke 17. The flexible drive ring 55 is also secured to the armature 32 by three bolts 56 equally spaced about the circumference of the armature, so that the armature disk 32 can move axially by deflection of the flexible ring 55. The bolts 56 also are arranged between and equally spaced from the adjacent bolts 31. Three springs 40 are equally spaced about the face of the armature disk 32 and extend through openings 41 in the disk 32 near the bolts 56. As shown in Fig. 2, these springs engage the inner surface of the flexible drive ring 55 and yieldingly urge the armature disk 32 away from the core 16 and the yoke 17 when the clutch is deenergized.

A bell-shaped power transmitting member 42 of the clutch having a cylindrical flange 43 is rotatably supported by ball bearing 44 on the shaft 10, and is provided with a double groove pulley 45 arranged to receive V-belts for providing a driving connection with the apparatus driving or driven by the pulley 45. A radially extending annular driving plate or member 46 is mounted between the friction clutch facings 20 and 34 in an axially movable relation between flexible annular drive rings 57 on spacers 47 which are secured to rim 48 of the power transmitting member 42 by three bolts 49 arranged about the periphery of the rim 48 and equally spaced apart. The flexible drive rings 57 also are secured to the driving plate 46 by three rivets 59 which extend through the driving plate 46 and the drive rings 57, so that the driving plate 46 can move axially by deflection of the flexible rings 57. The rivets 59 are equally spaced apart about the periphery of the driving plate 46 and arranged between and equally spaced from the bolts 49. Three springs 50 are equally spaced apart between the bolts 49 and are arranged in spring seats 51 formed in the power transmitting member 42. These springs 50 engage spring seats 52 formed on the driving plate 46 and yieldingly urge the driving plate 46 away from the rim 48 of the power transmitting member 42. Washers 53 are arranged on the retaining bolts 49 to limit the axial movement of the driving plate 46 to a position out of contact with the friction facings 20 and 34 when the clutch is deenergized. The air gap between the armature disk 32 and the core 16 is made relatively small so that a very small amount of power is required to operate the clutch, thereby providing a very efficient construction.

In order to exclude dust and dirt from my improved clutch, an end shield 54 is arranged about the driving plate 46 and the armature 32 of the electromagnetic clutch and is secured by the nuts 37 to the bolts 49 and to the power transmitting member 42 to form a closure therewith. This arrangement provides a totally enclosed housing about the moving parts of the clutch and effectively seals it against possible injury from foreign matter, such as dust, grit, or moisture.

When the clutch is energized, an axial magnetic pull is exerted upon the armature 32 by the core 16 and the yoke 17 and the armature moves axially compressing the springs 40, so as to decrease the air gap and thereby reduce the reluctance between these parts of the clutch magnetic circuit. This axial movement of the armature 32 brings the friction clutch facing 34 against the driving plate 46 and moves the driving plate axially against the pressure of the springs 50 into a clamped engagement between the friction clutch facings 20 and 34 thereby forming a driving connection between the member 42 and the shaft 10. Power can then be transmitted from the coupling 11 to the pulley 45 or from the pulley 45 to the coupling 11. When the clutch is deenergized, the springs 40 urge the armature 32 and the friction clutch facing 34 axially out of contact with the driving plate 46 and the springs 50 urge the driving plate 46 out of engagement with the friction clutch facing 20, thereby disengaging the driving connection between the power transmitting member 42 and the shaft 10.

While I have illustrated and described a particular embodiment of my invention, modifications thereof will occur to those skilled in the art. I desire it to be understood, therefore, that my invention is not to be limited to the particular arrangement disclosed and I intend in the appended claims to cover all modifications which do not depart from the spirit and scope of my invention.

What I claim as new and desire to secure by Letters Patent of the United States, is:

1. A magnetic clutch including a rotatable shaft, a central magnetic core carried by said shaft, a magnetic yoke mounted on said shaft, means including an armature mounted in an axially movable relation on and extending about said yoke for completing a magnetic circuit including said core and said yoke, a power transmitting member rotatably mounted about said shaft and surrounding said yoke, and means for magnetically operating said armature to provide a driving connection between said shaft and said power transmitting member.

2. A magnetic clutch including a rotatable shaft arranged to provide a central magnetic core for said clutch, a magnetic yoke mounted on said shaft and provided with a friction clutch facing, means including an armature having a friction clutch facing and being mounted in an axially movable relation on and extending about said yoke for completing a magnetic circuit including said core and said yoke, a power transmitting member rotatably mounted about said drive shaft and extending between said friction clutch facings, and means for magnetically operating said armature to provide a driving connection between said shaft and said power transmitting member.

3. A magnetic clutch including a rotatable shaft, a central magnetic core carried by said shaft, an exciting winding arranged about said core, a magnetic yoke mounted on said shaft and surrounding said exciting winding, means including an armature mounted on and extending about said yoke for completing a magnetic circuit including said core and said yoke, a power transmitting member rotatably mounted about said shaft and surrounding said yoke, said power transmitting member being arranged to provide a driving connection with said rotatable shaft upon energization of said exciting winding.

4. A magnetic clutch including a rotatable shaft, a central magnetic core carried by said shaft, an exciting winding arranged about said core, a magnetic yoke mounted on said shaft surrounding said exciting winding and provided with a friction clutch facing, means including an armature extending about said yoke and having a friction clutch facing mounted on said yoke for completing a magnetic circuit including said core and said yoke, and a power transmitting member rotatably mounted about said shaft and arranged to provide a driving connection through said friction clutch facings with said shaft upon energization of said exciting winding.

5. A magnetic clutch including a rotatable shaft arranged to provide a central magnetic core for said clutch, a magnetic yoke mounted on said shaft and provided with a friction clutch facing, an armature having a friction clutch facing and being mounted in an axially movable relation on and extending about said yoke, means for yieldingly urging said armature away from said core, a power transmitting member rotatably mounted about said drive shaft and having a driving member associated therewith extending between said friction clutch facings, means for yieldingly urging said driving member out of engagement with said friction clutch facings, and means including an exciting winding magnetically operating said armature for providing a driving connection between said shaft and said power transmitting member.

6. A magnetic clutch including a rotatable shaft, a central magnetic core carried by said shaft, a magnetic yoke mounted on said shaft and provided with a friction clutch facing, an armature having a friction clutch facing and extending about said yoke arranged to cooperate magnetically with said core, a drive ring secured to said armature at equidistantly spaced points, means arranged equidistantly intermediate said equidistantly spaced points securing said drive ring to said magnetic yoke for mounting said armature in an axially movable relation on said yoke, said armature having openings therethrough and covered by said drive ring, means including a spring arranged in each of said openings in engagement with said yoke and said drive ring for yieldingly urging said armature away from said core, a power transmitting member rotatably mounted about said drive shaft and having a driving member extending between said friction clutch facings, means for yieldingly urging said driving member out of engagement with said friction clutch facings, and means for magnetically operating said armature and for providing a driving connection between said shaft and said power transmitting member through said friction clutch facings.

7. A magnetic clutch including a rotatable shaft arranged to provide a central magnetic core for said clutch, means for rotatably supporting said shaft, an exciting winding arranged about said core, a magnetic yoke surrounding said exciting winding, means including an armature mounted in axially movable relation on and extending about said yoke for completing a magnetic circuit including said magnetic core and said magnetic yoke, means for yieldingly urging said armature away from said core, and a power transmitting member rotatably mounted about said shaft and having a driving plate axially movable thereon and extending between said armature and said yoke, said driving plate being arranged to provide a driving connection between said shaft and said power transmitting member upon energization of said exciting winding.

8. A totally enclosed magnetic clutch including a rotatable shaft arranged to provide a central magnetic core for said clutch, an exciting winding arranged about said core, a magnetic yoke surrounding said exciting winding and provided with a friction clutch facing, means including an armature extending about said yoke and having a friction clutch facing mounted in an axially movable relation on said yoke for completing a magnetic circuit including said magnetic core and said magnetic yoke, a power transmitting member rotatably mounted about said shaft having a driving plate axially movable on said power transmitting member, said driving plate being arranged to form a driving connection between said shaft and said power transmitting member upon energization of said winding, and an end shield cooperating with said power transmitting member to enclose said magnetic clutch.

9. A totally enclosed magnetic clutch including a rotatable shaft of magnetic material arranged to provide a central magnetic core for said clutch, an exciting winding arranged about said core, means for rotatably supporting said shaft, a magnetic yoke surrounding said exciting winding secured to said shaft and provided with a friction clutch facing, means including an armature surrounding said yoke and having a friction clutch facing mounted in an axially movable relation on said yoke for completing a magnetic circuit with said magnetic core and said magnetic yoke, means for yieldingly urging said armature away from said core, a power transmitting member rotatably mounted about said shaft and having a driving plate axially movable thereof, said driving plate being arranged to provide a driving connection between said shaft and said power transmitting member upon energization of said winding, means for yieldingly urging said driving plate out of engagement with said friction clutch facings, and an end shield cooperating with said power transmitting member to enclose said magnetic clutch.

10. A magnetic clutch including a rotatable shaft, a central magnetic core on said shaft, a magnetic yoke on said shaft, an armature, means for supporting said armature on said yoke in an axially movable relation with respect to said core, said armature having a variable air-gap between said armature and said core and a substantially constant small air-gap between said armature and said yoke, a power transmitting member rotatably mounted about said shaft, and means for magnetically operating said armature to provide a driving connection between said shaft and said power transmitting member.

LA MAR S. COOPER.